United States Patent
Roquemore, III et al.

(10) Patent No.: US 7,681,431 B2
(45) Date of Patent: Mar. 23, 2010

(54) METHOD OF CALIBRATING A SCALE

(75) Inventors: John P. Roquemore, III, Snellville, GA (US); Donald A. Collins, Jr., Buford, GA (US)

(73) Assignee: NCR Corporation, Dayton, OH (US)

(*) Notice: Subject to any disclaimer, the term of this patent is extended or adjusted under 35 U.S.C. 154(b) by 280 days.

(21) Appl. No.: 11/734,373

(22) Filed: Apr. 12, 2007

(65) Prior Publication Data

US 2008/0255790 A1 Oct. 16, 2008

(51) Int. Cl.
*G01G 19/56* (2006.01)
(52) U.S. Cl. ........................................ 73/1.13
(58) Field of Classification Search .............. 73/1.13; 177/32, 45
See application file for complete search history.

(56) References Cited

U.S. PATENT DOCUMENTS

| | | | | |
|---|---|---|---|---|
| 2,331,642 A | * | 10/1943 | Weber et al. | 177/46 |
| 5,266,958 A | * | 11/1993 | Durboraw, III | 342/357.08 |
| 5,780,782 A | * | 7/1998 | O'Dea | 177/136 |
| 6,209,382 B1 | * | 4/2001 | Komata et al. | 73/1.13 |
| 6,284,987 B1 | * | 9/2001 | Al-Modiny | 73/1.13 |
| 2007/0074910 A1 | * | 4/2007 | Kesselman | 177/25.13 |

* cited by examiner

*Primary Examiner*—Hezron Williams
*Assistant Examiner*—Alex Devito
(74) *Attorney, Agent, or Firm*—Paul W. Martin; Priest & Goldstein PLLC

(57) ABSTRACT

A method of calibrating a scale which enforces exercise requirements. The method includes causing an interface to provide a first indication to place weight on the scale by control circuitry of the scale, receiving weight signals from a load cell by the control circuitry, causing the interface to provide a second indication that exercising has begun and of the level of weight applied by the control circuitry, determining that a minimum recommended calibration weight has been placed on the scale by the control circuitry, and causing an interface to provide a third indication that the minimum recommended calibration weight has been placed on the scale by the control circuitry.

19 Claims, 3 Drawing Sheets

METHOD OF CALIBRATING A SCALE

BACKGROUND

Whenever a scale is installed for commercial purposes, it must be calibrated prior to being brought into service. In order to ensure that the scale is ready to operate over its full range of motion, the best practice is to exercise the scale prior to performing calibration. This involves loading up the scale with the maximum weight it can read and unloading it at least a couple of times. However, this is not an easy task and it is easily forgotten or skipped.

It would be desirable to provide a method of calibrating a scale that overcomes this problem.

SUMMARY

A method of calibrating a scale is provided.

The method includes causing an interface to provide a first indication to place weight on the scale by control circuitry of the scale, receiving weight signals from a load cell by the control circuitry, causing the interface to provide a second indication that exercising has begun and of the level of weight applied by the control circuitry, determining that a minimum recommended calibration weight has been placed on the scale by the control circuitry, and causing an interface to provide a third indication that the minimum recommended calibration weight has been placed on the scale by the control circuitry.

DETAILED DESCRIPTION

Figure 1:
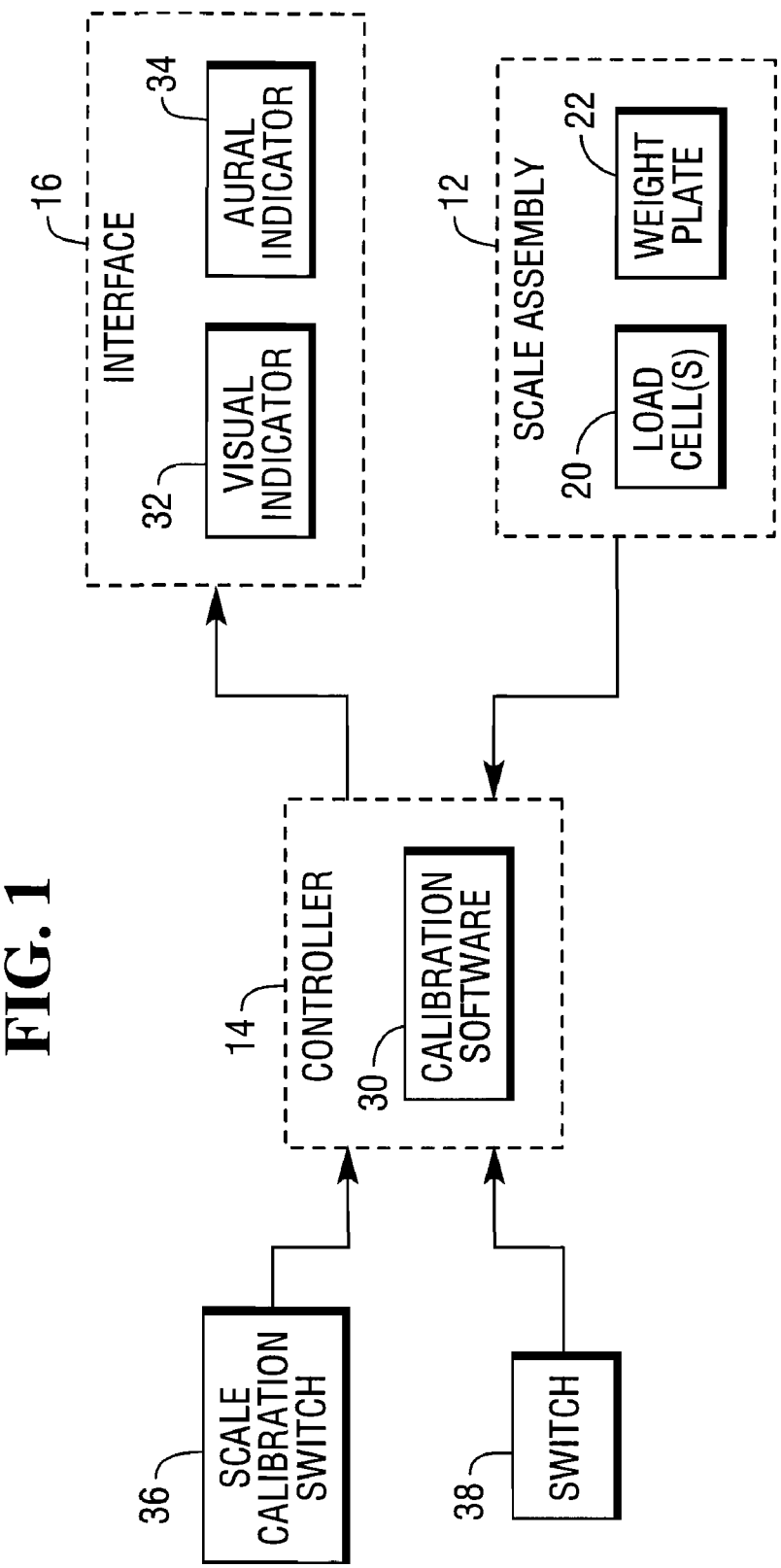
FIG. 1 is a block diagram of an example scale system.

With reference to FIG. 1, an example embodiment of a scale system 10 includes scale assembly 12, controller 14, and interface 16.

Scale assembly 12 includes one or more load cells 20 and weigh plate 22. Load cell 20 may include a planar load cell, such as that manufactured by Flintec, Inc. Scale assembly 12 may include additional structure for stabilizing load cell 20 or for mounting weigh plate 22 above load cell 20.

Controller 14 receives weight signals from load cell 20 and executes calibration software 30 in response to a signal from scale calibration switch 36. Controller 14 activates interface 16 in order to provide instructions and feedback to an operator. Controller 14 additionally receives a signal from scale zeroing switch for zeroing operations.

Interface 16 may include visual indicator 32 and aural indicator 34. Visual indicator 32 may include light emitting diodes (LEDs) or a liquid crystal display (LCD) for displaying instructions and feedback to an operator.

Aural indicator 34 may include a speaker.

Figure 2:
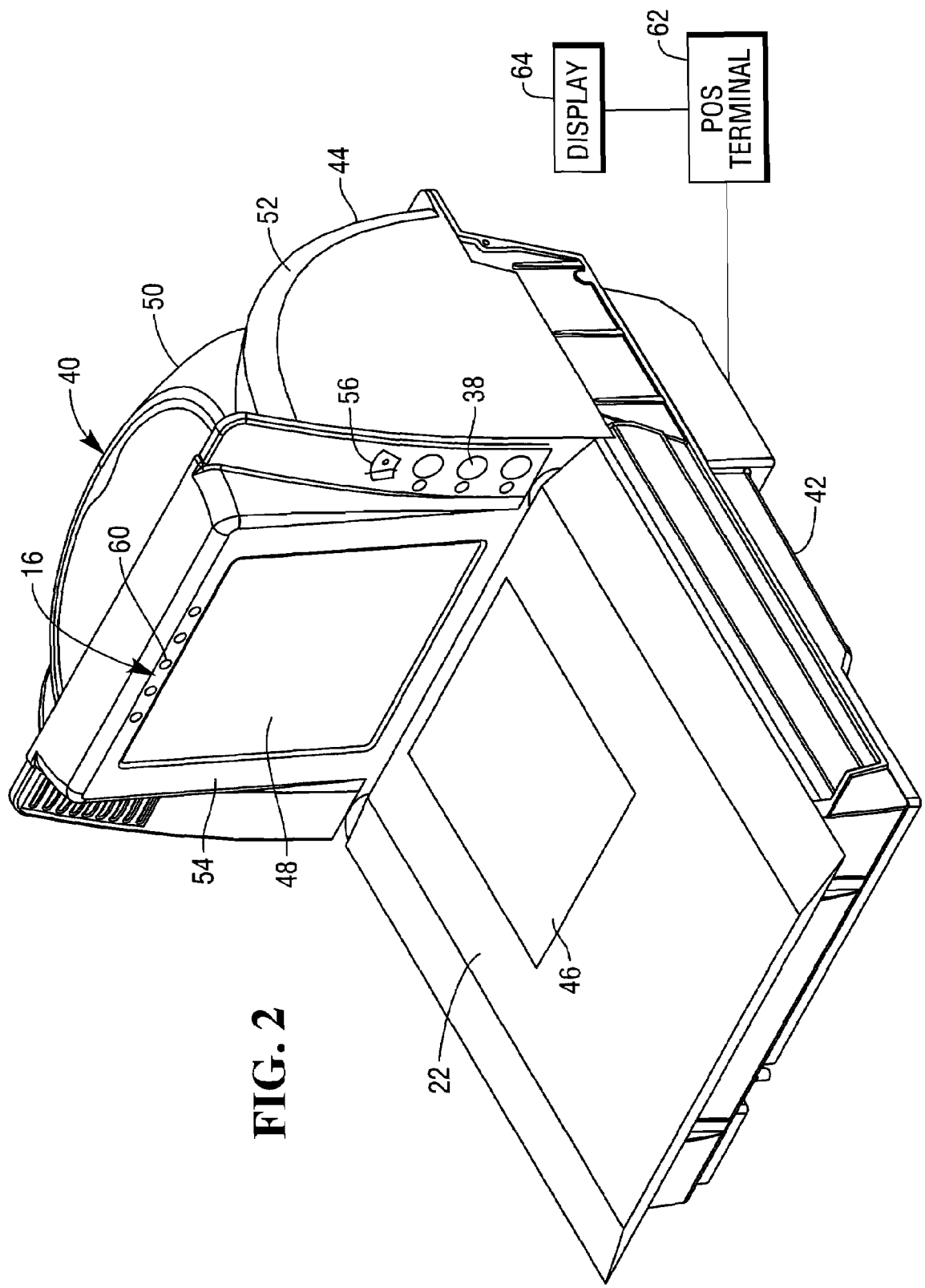
FIG. 2 is a perspective view of an optical barcode scanner containing a scale that requires calibration.

With respect to FIG. 2, an example device containing scale assembly 12 includes optical barcode scanner 40. Scanner 40 includes a horizontal portion 42 and a vertical portion 44. Horizontal portion 42 includes window 46 through which scanning light beams pass. Window 46 is in scale weigh plate 22. Vertical portion 44 includes window 48 through which scanning light beams pass.

Vertical portion 44 further includes housing 50. An example housing as illustrated includes a main housing portion 52 and a bezel 54.

Bezel 54 includes a switch activation area 56, including scale zeroing switch 38.

Bezel 54 further includes a visual display indicator 32 that includes indicator lights 60. Indicator lights 60 may include LEDs.

Scanner 10 is coupled to point-of-sale (POS) terminal 62. A display 64 may be coupled to POS terminal 62.

Figure 3:
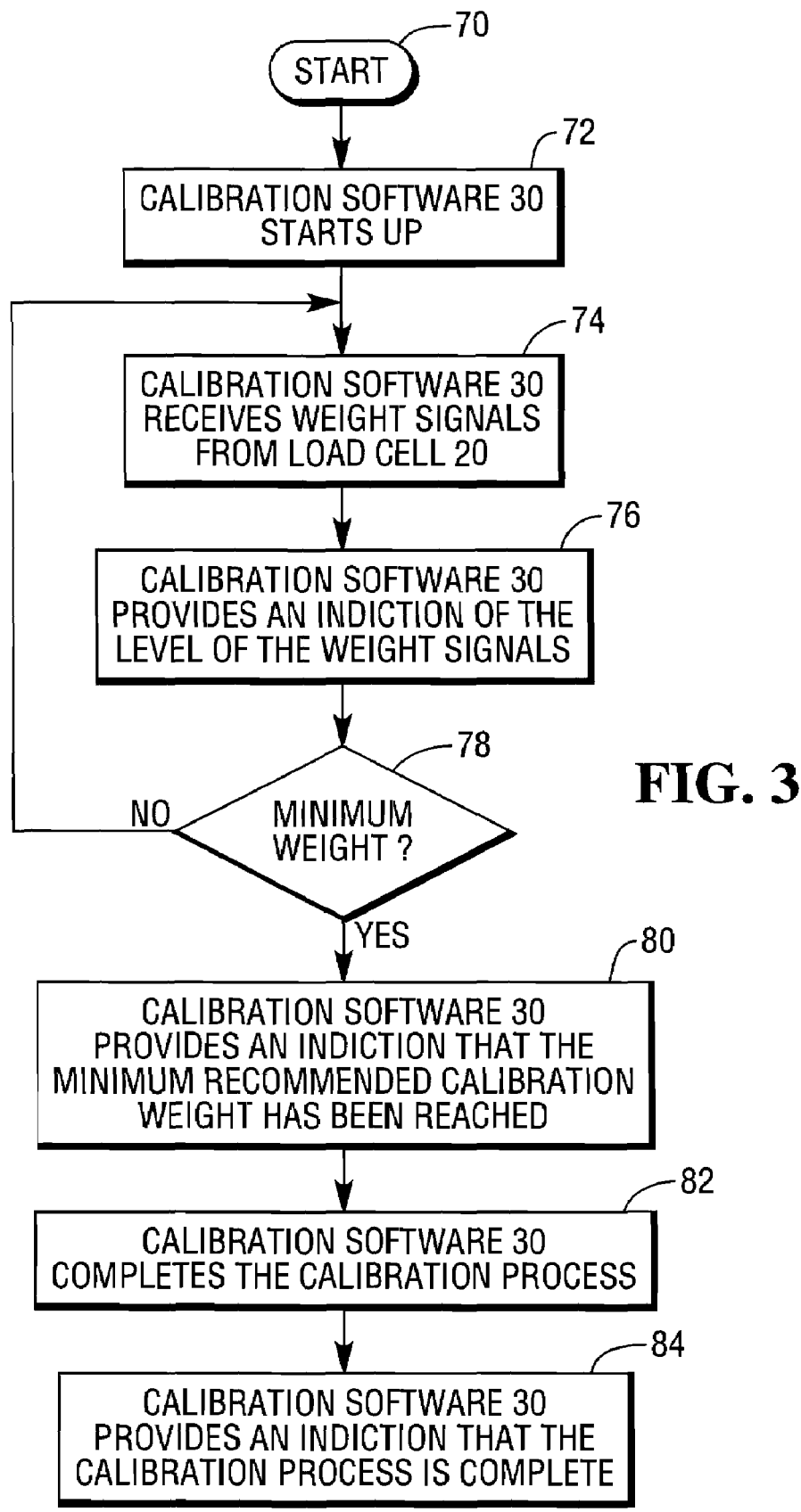
FIG. 3 is a flow diagram illustrating the calibration method.

Referring now to FIG. 3, an example calibration method is illustrated beginning with START 70.

Calibration software 30 will not allow calibration to proceed unless scale assembly 12 is exercised properly.

Weight may include conventional weights. Weight may also include a downward force applied by an operator in order to save time.

In step 72, calibration software 30 starts up in response to operator activation of scale calibration switch 36. Scale calibration switch 36 is usually rigged with a tamper-resistant device, such as a lead sealed wire or tamper resistant label. Activation of scale calibration switch 36 requires disabling of the tamper-resistant device.

In step 74, calibration software 30 receives weight signals from load cell 20.

In step 76, calibration software 30 causes interface 16 to provide an indication that exercising has begun and of the level of weight applied.

For example, calibration software 30 may use indicator lights 60 as a progress bar to indicate a relative weight on weigh plate 22 between zero weight and the minimum recommended calibration weight, activating an increasing number of indicator lights 60 as weight on weigh plate 22 increases.

As another example, calibration software 30 may progressively change the color of lights 60 as more weight is applied.

Calibration software 30 may use indicator lights 60 to instruct an operator or to reflect placement of an additional incremental weight on scale 22. After the incremental weight is added an operator may be required to activate a switch, such as scale zeroing switch 38, in order to pace the progress of applying additional incremental weights.

As another example, calibration software 30 may cause LCD display 64 to display actual weight added.

Calibration software 30 may also provide aural indications of weight added or instructions for adding additional weight.

In step 78, calibration software 30 determines whether the weight signals indicate that the minimum recommended calibration weight has been placed on scale weigh plate 22. If so, operation proceeds to step 80. Otherwise, operation returns to step 74.

In step 80, calibration software 30 provides an indication that the minimum recommended calibration weight has been reached. For example, calibration software 30 may cause lights 60 to display a different color as weight thresholds are reached, including the minimum recommended calibration weight. Calibration software 30 may additionally provide aural feedback to an operator.

In step 82, calibration software 30 completes the calibration process.

In step 84, calibration software 30 provides an indication that calibration is complete. For example calibration software 30 may cause lights 60 to flash a predetermined pattern, or speak, "calibration complete", through aural indicator 34.

Calibration software 30 may require that the exercise procedure (steps 74-84) be completed multiple times before finishing.

Advantageously, forcing completion of the exercise procedure results in more accurate calibrations in the field and reduces the number of repeat calibrations by field service personnel.

Although particular reference has been made to certain embodiments, variations and modifications are also envisioned within the spirit and scope of the following claims.

What is claimed is:

1. A method of calibrating a scale comprising:
   (a) sensing activation of a scale calibration switch by a controller;
   (b) initiating a calibration procedure, by the controller causing an interface to provide a first indication to an operator to place weight on the scale;
   (c) receiving weight signals from a load cell as increasing weight is progressively placed on the scale;
   (d) upon detection by the controller of the weight signals, causing the interface to provide a second indication that exercising has begun and of the level of weight applied;
   (e) as the controller detects signals indicating progressively increasing levels of weight, analyzing the weight signals by the controller to determine if a recommended calibration weight approximately equal a maximum weight the scale is designed to read has been placed on the scale; and
   (f) upon determination by the controller that the recommended calibration weight has been placed on the scale, utilizing the controller to control an interface to provide a third indication that the recommended calibration weight has been placed on the scale.

2. The method of claim 1, wherein the first indication comprises an instruction provided to the operator to place weight on the scale as part of the installation of a barcode scanner and scale assembly by the operator.

3. The method of claim 1, wherein the first indication comprises an instruction for the operator to manually exert downward force on the scale.

4. The method of claim 1, wherein the first, second, and third indications comprise visual displays.

5. The method of claim 1, wherein the first, second, and third indication comprise aural outputs.

6. The method of claim 1, wherein the second indication comprises:
   activating a number of a plurality of indicator lights to form a progress bar indicating a relative weight between zero and the recommended calibration weight.

7. The method of claim 1, wherein the second indication comprises:
   activating a plurality of indicator lights, and
   changing color of the indicator lights as different weight thresholds have been reached.

8. The method of claim 1, wherein the second indication comprises:
   controlling a display coupled to the scale to display actual weight added.

9. The method of claim 1, wherein the third indication comprises:
   activating a plurality of indicator lights to indicate that the recommended calibration weight has been reached.

10. The method of claim 1, wherein the third indication comprises:
    activating a plurality of indicator lights; and
    changing color of the indicator lights to indicate that the recommended calibration weight has been reached.

11. The method of claim 1, wherein the third step comprises:
    controlling a display coupled to the scale to display a message to indicate that the recommended calibration weight has been reached.

12. The method of claim 1, further comprising:
    (g) directing the controller to control the interface to provide a fourth indication that calibration is complete.

13. The method of claim 12, wherein the fourth indication comprises a visual indication.

14. The method of claim 12, wherein the fourth indication comprises an aural indication.

15. The method of claim 1 further comprising:
    (g) removing all weight placed on the scale; and
    (h) repeating steps (c) through (g) a predetermined number of times.

16. A method of exercising a scale as part of calibration of the scale upon installation for commercial purpose, the method comprising:
    sensing activation of a scale calibration switch by a controller;
    initiating a calibration process by the controller with an exercise process;
    providing an indication to an operator to load the scale with a recommended calibration weight, where the recommended calibration weight is a maximum weight the scale is designed to read;
    utilizing the controller to monitor weight signals from a load cell as the scale is loaded;
    determining by the controller when the recommended calibration weight is reached by analyzing the weight signals; and
    providing an indication to the operator that the recommended calibration weight has been reached.

17. The method of claim 16 wherein the scale is an integral part of a bar code scanner scale unit having visual and aural outputs mounted on a housing and utilized to provide the indication to the operator to load the scale and the indication to the operator that the recommended calibration weight has been reached.

18. The method of claim 17 further comprising loading the scale to the recommended calibration weight and unloading and reloading multiple times prior to performing further calibration.

19. A method of calibrating a scale comprising:
    (a) sensing activation of a scale calibration switch by a controller;
    (b) initiating a calibration procedure, by the controller causing an interface to provide a first indication to an operator to place weight on the scale;
    (c) receiving weight signals from a load cell as weight is placed on the scale;
    (d) upon detection by the controller of the weight signals, causing the interface to provide a second indication that exercising has begun and of the level of weight applied;
    (e) as the controller detects signals indicating increasing levels of weight, analyzing the weight signals by the controller to determine if a recommended calibration weight has been placed on the scale; and
    (f) upon determination by the controller that the recommended calibration weight has been placed on the scale, utilizing the controller to control an interface to provide a third indication that the recommended calibration weight has been placed on the scale;
    (g) removing all weight placed on the scale; and
    (h) repeating steps (c) through (g) a predetermined number of times.

* * * * *